United States Patent

[11] 3,615,647

| [72] | Inventor | Clyde P. Kassens |
| | | Liberty, Ind. |
| [21] | Appl. No. | 716,309 |
| [22] | Filed | Mar. 27, 1968 |
| [45] | Patented | Oct. 26, 1971 |
| [73] | Assignee | Perk Foods Co. |

[54] EXPANDED FAT-COATED ANIMAL FOOD HAVING A COHERENT COATING
9 Claims, No Drawings

| [52] | U.S. Cl. | 99/2 R, |
| | | 99/18, 99/166, 117/85, 117/87, 117/100 A, 99/4 |
| [51] | Int. Cl. | A23k 1/10 |
| [50] | Field of Search | 99/2, 166, |
| | | 169, 141, 83, 18; 195/14, 17; 117/85, 87, 100 A |

[56] References Cited
UNITED STATES PATENTS

| 3,318,706 | 5/1967 | Fast | 99/83 |
| 3,467,525 | 9/1969 | Hale et al. | 99/2 |
| 3,484,250 | 12/1969 | Vollink et al. | 99/83 |
| 2,788,277 | 4/1957 | Huber | 99/83 |
| 2,822,303 | 2/1958 | Campbell et al. | 99/142 |
| 2,868,647 | 1/1959 | Vollink | 99/83 |
| 3,094,947 | 6/1963 | Green et al. | 99/83 |
| 3,119,691 | 1/1964 | Ludington et al. | 99/2 |

*Primary Examiner*—Norman Yudkoff
*Assistant Examiner*—Curtis P. Ribando
*Attorney*—Dressler, Goldsmith, Clement & Gordon ABSTRACT: A porous, expanded animal food is provided comprising chunks having starch-containing and protein-containing constituents. The chunks are covered with a coating of fat, which coating is overlaid with a coherent coating containing dextrinized starch to prevent the migration of volatile ingredients and nutrients away from the food product and to provide a hard, nongreasy coating which also prevents fat loss or leakage from the surface of the chunks and protects the fat against oxidative rancidity. The coherent coating is applied by wetting the surface of the chunks with an aqueous solution of the dextrinized starch and thereafter drying off the aqueous solvent.

EXPANDED FAT-COATED ANIMAL FOOD HAVING A COHERENT COATING

BACKGROUND OF THE INVENTION

Expanded, fat-coated animal foods and methods for making them are well known to the art. See U.S. Pat. Nos. 3,139,342 and 3,119,691. Basically, a nutritionally balanced mixture of finely divided food products such as corn meal, meat and bone meal, soy meal and wheat middlings, supplemented by vitamins and minerals, is wetted with water and steam, heated under compression to a temperature above the boiling point of water, and extruded out of an extrusion die into the open air. As the superheated mass passes out of the die, it expands by flash vaporization of the water and rupture of the starch particles into a porous, expanded product. This product is then cut into chunks and dried to form discrete, porous chunks. Melted fat, usually tallow, is applied to the chunks, as by spraying, to form an outer coating. This fat-coated product is widely sold at present as a commercial animal food. Before feeding, water may be added to the food to cause its rehydration into soft, edible particles, or the product may be fed dry, if desired.

The above fat-coated product has a number of disadvantages. First, its fat-coated surface is naturally greasy, which gives an undesirable "feel" to the material and which commonly forces packagers to sell the product in grease-resistant lined containers, because paper containers absorb the fat, resulting in an unsightly and unsalable package.

Second, the volatile flavoring agents which are naturally present in the fat-coated food product, as well as any such agents which are added to increase the palatability, have a tendency to diffuse through the fat coating and to evaporate. Thus the palatability of these fat-coated food products has a tendency to decrease upon standing as the volatile flavoring agents slowly evaporate.

Third, the fat coating on the product is exposed to the oxygen of the air and is thus subject to oxidative rancidity.

Finally, many types of fat-coated, expanded food products are subject to breakage in the bag during shipping and handling, resulting in undesirable "crumbling" of the product.

This application relates to an improvement in fat-coated, expanded animal food products in which the above disadvantages are minimized or eliminated without detracting from the palatability of the product.

SUMMARY OF THE INVENTION

This invention relates to an animal food product made of porous, expanded chunks having starch-containing and protein-containing constituents. The chunks of food are covered with a coating of fat, and have a coherent coating on the exterior of the fat which contains dextrinized starch. The dextrinized starch coating covers the fat coating to eliminate the conventional, greasy feel of the fat-containing animal food and to seal each chunk with a coating which is essentially impermeable to flavoring agents, thus preventing the flavoring agents from escaping from the food with the result of prolonging its palatability.

The flavoring agents utilizable in conjunction with this invention may be of several different types with respect to solubility, and the invention may be modified to provide for optimum flavor utilization with each type.

For example, water soluble, or water dispersible flavoring agents are preferably incorporated into the dextrinized starch coating, itself, by incorporation into the coating solution. Such flavorings will remain bound in the coating until released by addition of water at feeding time.

Fat soluble flavorings are most advantageously applied in the fat coating which is thereafter coated with the dextrinized starch. Here again, the dextrin coating protects the flavoring until released by the addition of water.

This invention makes possible the use of soft or liquid fatty flavorings, such as chicken fat or fish oil, which could not be applied to the surface of expanded chunks before because of their tendency to migrate or run. With the present invention, such fatty flavorings may be incorporated into the tallow layer on the chunks; and any tendency of the flavorings to run is controlled by the superimposed dextrinized starch layer.

Finally, the invention also contemplates the protection of flavorings which are neither water soluble nor fat soluble and which may be applied as a dusty layer over the fat, and over which the dextrinized starch layer is then applied. Fish meal is typical of the flavoring of this type.

In all of the embodiments discussed above the flavoring agent is located at or near the surface of the chunks and is therefore particularly effective because of its ready availability to the senses of the animal.

The dextrinized starch coating is hard and coherent, and it protects the chunks from breaking apart and "crumbling" during handling and shipping. However, the dextrinized starch coating is water-dispersible, and thus when water is applied to the coated animal food product, the dextrinized coating is rapidly penetrated by the water so that the dry food product is quickly rehydrated and ready for consumption.

Dextrins are the higher polysaccharides of dextrose and maltose, and are breakdown products of starch. Starch can be dextrinized by a conventional hydrolysis process in which dextrins are formed from starch. For example, starch can be dextrinized by hydrolyzing it with amylase or in an acid environment in the conventional manner. Starch can also be dextrinized by conventional thermal degradation.

The dextrinized starch used in this invention can contain undegraded starch along with the dextrins formed by breaking down the starch molecules, and it can also contain small amounts of dextrose formed by complete hydrolysis of some of the starch. Alternatively, artificially synthesized dextrins can be used herein as an equivalent to dextrinized starch.

Any type of starch can be dextrinized, e.g., corn starch, potato starch, or arrowroot starch.

The coating of dextrinized starch is applied to conventionally-made chunks of expanded animal food which have been coated with fat. It has been found that the dextrinized starch coating readily adheres to the fat to form a generally hard, coherent, exterior coating over the fat, eliminating the greasy feel of the known, fat-coated animal foods and increasing the strength of each chunk to reduce breakage.

The dextrinized starch coating is desirably applied to the fat-coated, expanded animal food in the form of a solution in water. The concentration of dextrinized starch in the water may be varied depending on the solubility of the dextrinized starch, the temperature of the solution, and the viscosity utilizable in the particular method of application. Concentrations from about 10 to about 50 weight percent of dextrinized starch and from about 50 to about 90 weight percent of water have been found to be suitable.

The dextrinized starch may be applied by dipping the chunks of fat-coated food in the solution, or by spraying or otherwise applying the solution to the food chunks. Good results are obtained when from about 5 to 30 weight percent of the composition containing dextrinized starch and water is applied to the animal food, based on the weight of the animal food before applying the dextrinized starch coating. The weight of the dextrinized starch present in the finished product is typically from about 1 to about 15 weight percent of the total product. Generally, chunks having rough surfaces require greater amounts of coating material than chunks with smooth surfaces for achieving an effective barrier over the fat.

When it is desired to add flavoring additives to the coating composition containing dextrinized starch and water, the formulation typically contains from 10 to 30 weight percent of dextrinized starch, from 0.5 to 20 weight percent of flavoring additives, and from 50 to 90 weight percent of water.

Typical water soluble or dispersible flavoring additives and nutrients which can be added to dextrinized starch coating composition, alone or in combination, are vanillin, or vanilla extract, meat or fish solubles, cocoa, smoke flavor, protein concentrate, liver, dried whey, dried milk, meat extract, and artificial flavors. Flavoring additives are suitably added in concentrations to constitute in total, from 0.1 to 4 weight percent, based on the weight of the total product. A common flavoring additive is sucrose, which is typically added to the dextrinized starch-water composition in such a concentration that the total product containing the dextrinized starch coating has from 0.2 to 4 weight percent of added sucrose. Other additives which can be added to the dextrinized starch coating composition include food colors, preservatives and water soluble vitamins.

Fat soluble flavoring additives or nutrients may be used in the dextrinized starch coating composition when combined with a suitable emulsifier to make them water dispersible.

After application of the dextrinized starch-water coating to the fat-coated chunks of animal food, the coating is allowed to dry in a stream of hot air or by any other conventional means.

If desired, an additional coating of a dry "gravy-forming" agent such as a combination of a thickener (e.g., carboxymethylcellulose) and a dye can be added on top of the dextrinized starch coating of the animal food product of this invention to cause the formation of an artificial "gravy" or other sauce on the addition of water. It has been found that dry "gravy-forming" agent adheres well to the dextrinized starch coating although the coating is not sticky to the touch. When the product having successive coatings of fat, dextrinized starch and "gravy-forming" agent is wetted with sufficient water, the "gravy-forming" agent dissolves rapidly in the excess water to color it and thicken it and create the appearance of a "gravy."

The following is a typical example of the preparation of one embodiment of the animal food product of this invention.

Thirty pounds of chunks of an expanded, dry animal fool containing corn meal, fish meal, and other starches and proteins were agitated in a tumbler and simultaneously sprayed with thirty ounces of melted tallow to provide a thin fat coating on the chunks. The chunks typically measured about three-eighth inches to three-fourth inches across.

A coating composition was prepared by adding to 65 parts by weight of water, 23 parts of a dextrin having high clarity and low viscosity in water at 190° F. (Crystal Gum, sold by National Starch and Chemical Corporation), and prepared by the dextrinizing of tapioca starch. The dextrin was added slowly to the water while cold with constant agitation to avoid lumping. To this mixture was added 2 parts by weight of sucrose, 0.05 parts of Ethavan, an artificial vanilla flavoring, 0.05 parts of vanillin, 5 parts of cocoa, and 5 parts of dried milk. The mixture was then heated to 180°–190° F., and 0.03 parts by weight of Certified Color Red No. 2 was added.

One hundred parts by weight of fat-coated chunks of animal food were then sprayed with 20 parts by weight of the above hot coating composition while agitating the chunks in a revolving pan. After the spray application was complete, the chunks were dried to a moisture content of 8 to 12 percent with a hot air blower.

The finished product consisted of chunks having a hard, glazed, nongreasy coating sealing the interior of each chunk. The dextrinized starch content of the finished product was 4.3 weight percent based on total weight.

One hundred grams of the above-coated product was immersed in 300 ml. of water having a temperature of 70° F. for 2 minutes. Following this period of time, the chunks were removed from the water and broken open. It was noted that approximately 700 percent of the expanded kib present had been rehydrated by penetration with water to form a soft, water-soaked material. The dextrinized starch coating generally dispersed into the surrounding water during this period of time.

Another sample of the above chunks of animal food coated with dextrinized starch was placed on a filter paper in an oven at 100° F. for 72 hours. After this time, no fat stains were noted on the filter paper, while conventional fat-coated animal foods were found to stain a filter paper after only 15 minutes of contact at 100° F. The coated animal food prepared above showed no staining of Kraft paper similar to the type which is used as liners in packaging animal foods upon contact for 2 months at 100° F.

In another specific embodiment 23 parts by weight of dextrinized starch, 2 parts of sucrose, 5 parts of dried meat solubles were added to 70 parts of water in a kettle, with good agitation to prevent lumping. The temperature was raised to 190° F. to assure complete solubility.

One part by weight of the above-described solution was coated onto 5 parts of fat-coated nuggets in a tumbler; and the preparation was thereafter dried.

When the above preparation was moistened with an equal weight of water, it rehydrated rapidly and was highly palatable to dogs under kennel feeding conditions.

While the invention has been described with reference to specific examples, it will be apparent to those skilled in the art that various changes and modifications may be made.

What is claimed is

1. A porous, expanded animal food product comprising chunks having a nutritionally balanced mixture of starch-containing and protein-containing constituents including protein of animal origin, said chunks measuring about three-eighth inches to three-fourth inches across and being covered with a coating of fat on the exterior thereof, and having a hard, glazed, fat-free coherent coating comprising dextrin exterior of said fat.

2. The product of claim 1 in which the weight of the dextrin present is from about 1 to about 15 weight percent of the total product.

3. The product of claim 1 in which said dextrin coating defines the outer surface of said product.

4. The product of claim 1 in which said dextrin coating is covered with an outer coating of a powered, dry gravey-forming agent comprising a thickener and a dye.

5. The product of claim 1 in which said dextrin coating contains from 0.1 to 4 weight percent of flavoring additives, based on the weight of the total product.

6. The product of claim 1 in which said dextrin coating contains form 0.2 to 4 weight percent of added sugar, based on the weight of the total product.

7. The process of coating a porous, expanded animal food comprising chunks having starch-containing and protein-containing constituents including protein of animal origin, said chunks measuring about three-eighth inches to three-fourth inches across and being covered with a coating of fat on the exterior thereof, which comprises: applying to said food an aqueous composition comprising from about 10 to about 50 weight percent of dextrin, and drying said composition to form a hard, glazed, coherent, fat-free coating exterior of said fat.

8. The process of claim 8 in which said composition contains from 10 to 30 weight percent of dextrin from 0.5 to 20 weight percent of flavoring additives, and from 50 to 90 weight percent of water.

9. The process of claim 8 in which the weight of said composition applied to the food is from 5 to 30 weight percent, based on the weight of the animal food before coating with said composition.

* * * * *

UNITED STATES PATENT OFFICE
CERTIFICATE OF CORRECTION

Patent No. 3,615,647            Dated October 26, 1971

Inventor(s) CLYDE P. KASSENS

It is certified that error appears in the above-identified patent and that said Letters Patent are hereby corrected as shown below:

Column 2, line 31, insert after "dextrose" -- and maltose -- ; Column 2, line 71, after "to" add -- the --; Column 3, line 31, "fool" should be -- food --; Column 3, line 62, "700" should be -- 70 --. Claim 4, line 2, "powered" should be -- powdered; Claim 4, line 2, "gravey" should be -- gravy -- Claims 8 and 9, line 1 of each claim, "8" should be -- 7 --.

Signed and sealed this 18th day of April 1972.

(SEAL)
Attest:

EDWARD M. FLETCHER, JR.          ROBERT GOTTSCHALK
Attesting Officer                 Commissioner of Patents